(12) United States Patent
Lee et al.

(10) Patent No.: US 6,446,745 B1
(45) Date of Patent: Sep. 10, 2002

(54) CONTROL SYSTEM FOR ELECTRIC POWERED VEHICLE

(76) Inventors: Michael John Lee, 25984 Mesa Dr., Carmel, CA (US) 93923; William H. Lee, 1391 Green Valley Rd., Watsonville, CA (US) 95076

( * ) Notice: Subject to any disclaimer, the term of this patent is extended or adjusted under 35 U.S.C. 154(b) by 0 days.

(21) Appl. No.: 09/608,758

(22) Filed: Jun. 30, 2000

(51) Int. Cl.[7] ............................................. B62M 23/02
(52) U.S. Cl. ...................... 180/206; 180/65.1; 180/220; 180/205
(58) Field of Search ................................ 180/205, 220, 180/170, 65.1, 65.5, 65.8, 206, 207

(56) References Cited

U.S. PATENT DOCUMENTS

| | | | |
|---|---|---|---|
| 4,871,042 A | | 10/1989 | Hsu et al. |
| 5,487,442 A | | 1/1996 | Hua |
| 5,505,277 A | * | 4/1996 | Suganuma et al. .......... 180/206 |
| 5,798,702 A | * | 8/1998 | Okamoto et al. ........... 340/636 |
| 5,799,262 A | * | 8/1998 | Suzuki ......................... 701/93 |
| 5,806,621 A | * | 9/1998 | Soda et al. .................. 180/206 |
| 5,816,355 A | | 10/1998 | Battlogg et al. |
| 5,865,267 A | | 2/1999 | Mayer et al. |
| 5,910,714 A | * | 6/1999 | Buchanan et al. .......... 318/139 |
| 5,934,398 A | * | 8/1999 | Hotta ......................... 180/65.8 |
| 5,937,964 A | | 8/1999 | Mayer et al. |
| 6,006,850 A | * | 12/1999 | Yu ............................... 180/220 |
| 6,037,746 A | | 3/2000 | Sheng et al. |
| 6,039,137 A | * | 3/2000 | Schless ........................ 180/220 |
| 6,152,250 A | * | 11/2000 | Shu-Hsien .................. 180/220 |
| 6,247,548 B1 | * | 6/2001 | Hayashi et al. ............. 180/206 |

\* cited by examiner

Primary Examiner—Robert P. Olszewski
Assistant Examiner—James S. McClellan (74) *Attorney, Agent, or Firm*—O'Melveny & Myers LLP (57) ABSTRACT

A control system for an electric powered vehicle provides substantially greater control and related features than the simple control systems known in the art. The control system can be utilized with any type of electric powered vehicle, such as bicycles, scooters, tricycles, four-wheeled vehicles, and the like. In a first embodiment of the invention, the control system estimates an amount of heat generated in the vehicle electric motor and assigns heat credits based on the relationship between the estimated motor heat and a predetermined heat level. The operation of the motor is then controlled in accordance with the available heat credits so as to prevent overheating of the motor. In a second embodiment of the invention, the control system monitors the current state of charge of the battery and presents that information to the rider. Since the battery voltage is affected by the load on the battery mostly due to the motor, the motor is periodically disconnected from the battery so that an unloaded battery voltage measurement can be made. In a third embodiment of the invention, the control system monitors the current operational state of the motor to detect a failure mode in which the full battery voltage is applied to the motor, potentially causing it to run away at full torque and full speed. When a failure mode is detected, the control system first attempts to shut off control signals to the motor. If this fails to stop the failure mode condition, the control system disconnects the battery from the motor by opening a fuse. In a fourth embodiment of the invention, the control system includes a cruise control feature that allows the electric powered vehicle to operate at a desired speed set by the rider. In a fifth embodiment of the invention, the control system controls operation of vehicle lights to accommodate variations in battery voltage. In a sixth embodiment of the invention, the control system controls operation of a horn so that it can also function to provide audible signals reflection operational conditions of the vehicle. In a seventh embodiment of the invention, the control system allows the vehicle to operate in a biofeedback mode to serve as an exercise or training device for the rider.

15 Claims, 5 Drawing Sheets

CONTROL SYSTEM FOR ELECTRIC POWERED VEHICLE

BACKGROUND OF THE INVENTION

1. Field of the Invention

The present invention relates to electric powered vehicles, such as bicycles, and more particularly, to an electrical control system for an electric powered vehicle.

2. Description of Related Art

Small electric vehicles, such as electric bicycles, have been proposed and used in limited quantities since the early history of motorized vehicles. These electric vehicles have had limited commercial acceptance partially due to their limited features and simple control techniques that have been utilized to control the vehicles. In many cases the control is limited to on, off or multi-position switches that directly apply a battery voltage across a DC motor. The DC motor is directly connected or indirectly connected through a drive system, such as a gear, chain, or roller, to one of the wheels of the vehicle. These switches can connect the motor directly to the battery or they can energize a relay or other switch that will connect the motor to the battery. User accessories are typically controlled in the same manner. Horns and lights have been used on electric vehicles and they are typically controlled using a switch which directly connects the battery voltage to the device. Since these control systems are very simple, they have little or no safety features to protect the motor from overheating or from running away in a short circuit situation. The operation of the control systems also changes as the voltage of the battery changes with temperature or as it is discharged.

Accordingly, it would be very desirable to provide a control system for an electric powered vehicle that overcomes these and other drawbacks of the prior art.

SUMMARY OF THE INVENTION

The present invention is directed to a control system for an electric powered vehicle that provides substantially greater control and related features than the simple control systems known in the art. The control system can be utilized with any type of electric powered vehicle, such as bicycles, scooters, tricycles, four-wheeled vehicles, and the like.

In a first embodiment of the invention, the control system maintains an estimate of the temperature of the vehicle electric motor and also an estimate of the amount of heat that is being created in the motor. The continuous rated power level of the motor is defined such that the motor can operate continuously at this level without exceeding its maximum temperature rating. When the motor operates at a lower power level than the continuous rated power level, the temperature of the motor will decrease below the rated maximum temperature. As long as the motor temperature is below the maximum rated temperature, the motor can operate for a short period of time at a higher power level than the continuous rated power level and thereby create a higher amount of heat during that period without exceeding the maximum rated temperature. If the estimate of the amount of heat being dissipated by the motor is lower than the continuous rated power level, the control system acquires heat credits. Conversely, if the estimate of the amount of heat being dissipated by the motor is higher than the continuous rated power level, the control system expends heat credits. The net amount of heat credits in the control system defines how much above the continuous rated power level the motor can operate. As the number of heat credits decreases, the maximum current in the motor is decreased. This provides a smooth continuous degradation of torque to the electric vehicle as the motor heats up when it is pushed beyond its continuous rated power level.

More particularly, the control system includes a motor drive control circuit coupled to the motor and providing a motor drive signal thereto. A throttle control circuit provides a throttle signal to the motor drive control circuit corresponding to a desired speed of the motor. A heat control circuit is electrically connected to the motor and estimates an amount of heat within the motor. The heat control circuit makes a comparison between the estimated amount of heat and a threshold level. The heat control circuit adds heat credits to a baseline amount if the estimated amount of heat is below the threshold level and subtracts heat credits if the estimated amount of heat is above the threshold level. A motor current select circuit provides a motor current signal to the motor drive control circuit. The motor current signal corresponds to the throttle signal if the heat credits exceed the throttle signal, and the motor speed signal is reduced if the heat credits fail to exceed the throttle signal.

In a second embodiment of the invention, the control system monitors the current state of charge of the battery and presents that information to the rider. The state of charge is calculated from the battery voltage. Because the battery voltage varies both with the state of charge and with the amount of current that is being taken out of the battery, the battery is periodically disconnected from the load and put into a state where there is almost no current going into or out of the battery. This allows the battery voltage to be measured in a way that provides an accurate estimate of the state of charge of the battery. More particularly, the control system for an electric powered vehicle comprises a motor, a battery providing a power source for the motor, and a motor drive control circuit coupled to the motor and providing a motor drive signal thereto. A voltage sensing circuit is coupled to the battery and measures a charge state of the battery. The charge sensing circuit additionally provides a control signal to the motor drive control circuit to discontinue the motor drive signal for a period of time sufficient to sample an unloaded voltage output of the battery.

In a third embodiment of the invention, the control system monitors the current operational state of the motor to detect a failure mode in which the full battery voltage is applied to the motor, potentially causing it to run away at full torque and full speed. When a failure mode is detected, the control system first attempts to shut off control signals to the motor. If this fails to stop the failure mode condition, the control system disconnects the battery from the motor by opening a fuse. More particularly, the control system for an electric powered vehicle comprises a motor, a battery providing a power source for the motor, and a motor drive control circuit coupled to the motor and providing a motor drive signal causing the battery to be electrically connected to the motor. A failure mode detect circuit is coupled to the motor to detect a failure mode of the motor. The failure mode detect circuit further comprises two operational states upon detection of the failure mode. The first state is entered upon initial detection of the failure mode of the motor, wherein a first signal is provided to the motor drive control circuit to discontinue providing the motor drive signal. The second state is entered upon continued detection of the failure mode of the motor after a predetermined amount of time following providing the first signal, wherein a second signal is provided to disconnect the battery from the motor.

In a fourth embodiment of the invention, the control system includes a cruise control feature that allows the electric powered vehicle to operate at a desired speed set by the rider. The cruise control function can be disengaged by using the brake or pressing the horn, which are the usual panic responses by the rider. More particularly, the control system for an electric powered vehicle comprises a motor, a battery providing a power source for the motor, a motor drive control circuit coupled to the motor and providing a motor drive signal causing the battery to be electrically connected to the motor, and a throttle control circuit providing a throttle signal to the motor drive control circuit corresponding to a desired speed of the motor. A cruise control circuit is coupled to said throttle control circuit and provides a signal causing the throttle control circuit to lock the throttle signal at a current level. The cruise control circuit is disengaged upon receipt of any one of a horn input, a brake input and a cruise control toggle input.

In a fifth embodiment of the invention, the control system controls operation of vehicle lights to accommodate variations in battery voltage. The control system further comprises a battery, a light control circuit providing a light drive signal to a vehicle light, and a charge sensing circuit coupled to the battery and providing a signal reflecting a charge state of the battery. The light control circuit receives a first input from a light switch and a second input from the charge sensing circuit reflecting the charge state of the battery. The light control circuit modulates the light drive signal in accordance with the second input in order to provide a near constant level of illumination of the light with varying charge level of the battery.

In a sixth embodiment of the invention, the control system controls operation of a horn so that it can also function to provide audible signals reflection operational conditions of the vehicle. The control system further comprising a horn/beeper control circuit providing a horn/beeper drive signal to a horn. The horn/beeper control circuit includes a plurality of predetermined stored waveforms corresponding to respective sounds produced by the horn. The control system can command the horn to generate a desired sound by selecting an appropriate waveform.

In a seventh embodiment of the invention, the control system allows the vehicle to operate in a biofeedback mode to serve as an exercise or training device for the rider. In the biofeedback mode, the control system regulates the amount of power assist provided by the motor to ensure that the rider supplies sufficient physical force to achieve certain fitness goals, such as a desired heart rate or oxygen level. More particularly, the control system comprises a motor coupled to the electric powered vehicle to provide a power assist thereto, a motor drive control circuit coupled to the motor and providing a motor drive signal causing the battery to be electrically connected to the motor, a throttle control circuit providing a throttle signal to the motor drive control circuit corresponding to a desired speed of the motor, and a biofeedback control circuit coupled to the throttle control circuit and providing a signal causing the throttle control circuit to control a magnitude of the power assist to achieve a predetermined physical performance output by a rider of the electric powered vehicle.

A more complete understanding of the electrical system for an electric powered vehicle will be afforded to those skilled in the art, as well as a realization of additional advantages and objects thereof, by a consideration of the following detailed description of the preferred embodiment. Reference will be made to the appended sheets of drawings that which will first be described briefly.

DETAILED DESCRIPTION OF THE PREFERRED EMBODIMENT

The present invention satisfies the need for a control system for an electric powered vehicle that overcomes the drawbacks of the prior art. In the detailed description that follows, like element numerals are used to describe like elements illustrated in one or more of the figures.

Figure 1:
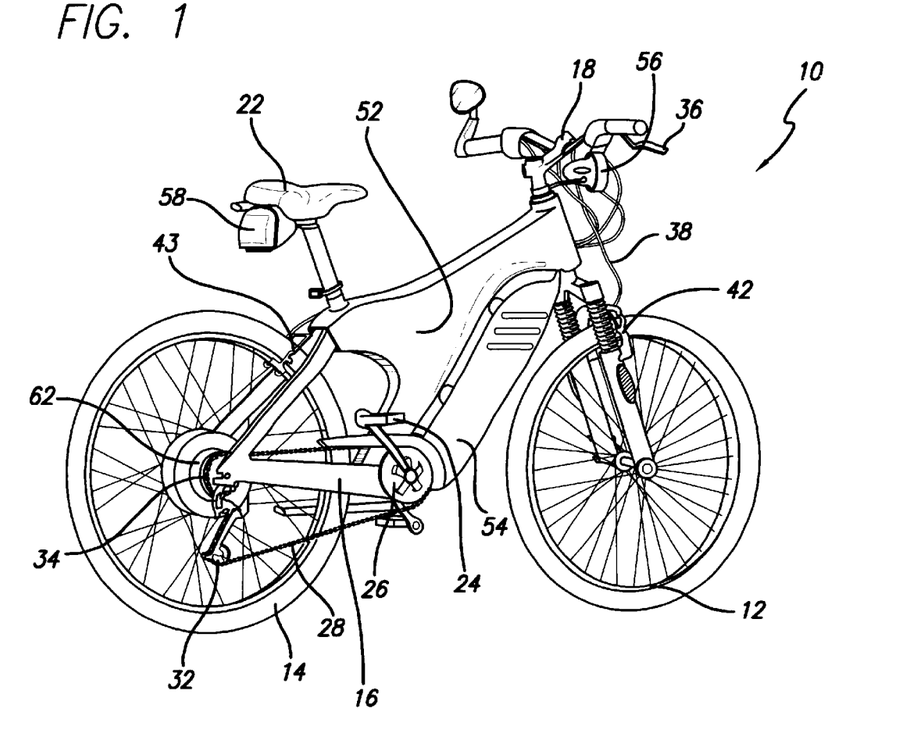
FIG. 1 is a perspective view of an exemplary electric powered bicycle.

Referring first to FIG. 1, an exemplary electric powered bicycle 10 is shown. The electric powered bicycle 10 contains many elements generally similar to conventional bicycles, such as front and rear wheels 12, 14, structural frame 16, handlebars 18, and seat 22. A conventional drive train for the bicycle 10 includes pedals 24, front chain ring 26, chain 28, derailleur 32 and rear gear cluster 34. A conventional brake system for the bicycle 10 includes left/right hand levers 36, cables 38, and brake calipers 42, 43. In addition to these conventional features, the electric powered bicycle 10 includes other unique elements. A bicycle body 52 encloses a portion of the frame 16, and includes a hollow internal space for housing electronic circuitry, wiring and battery pack. A hinged door 54 is connected to a portion of the body 52 and can be opened to provide access to the internal space of the bicycle body, such as to permit periodic replacement of the battery pack. The door 54 may also conceal electrical connections used to recharge the battery by plugging into a conventional AC electrical outlet. Front and rear lights 56, 58 are affixed to the handlebars 18 and seat 22, respectively. Lastly, a hub motor 62 is physically connected to the rear wheel 14 coaxially with the rear gear cluster 34. The hub motor 62 produces sufficient torque to cause the rear wheel 14 to rotate and thereby propel the bicycle 10.

Figure 2:
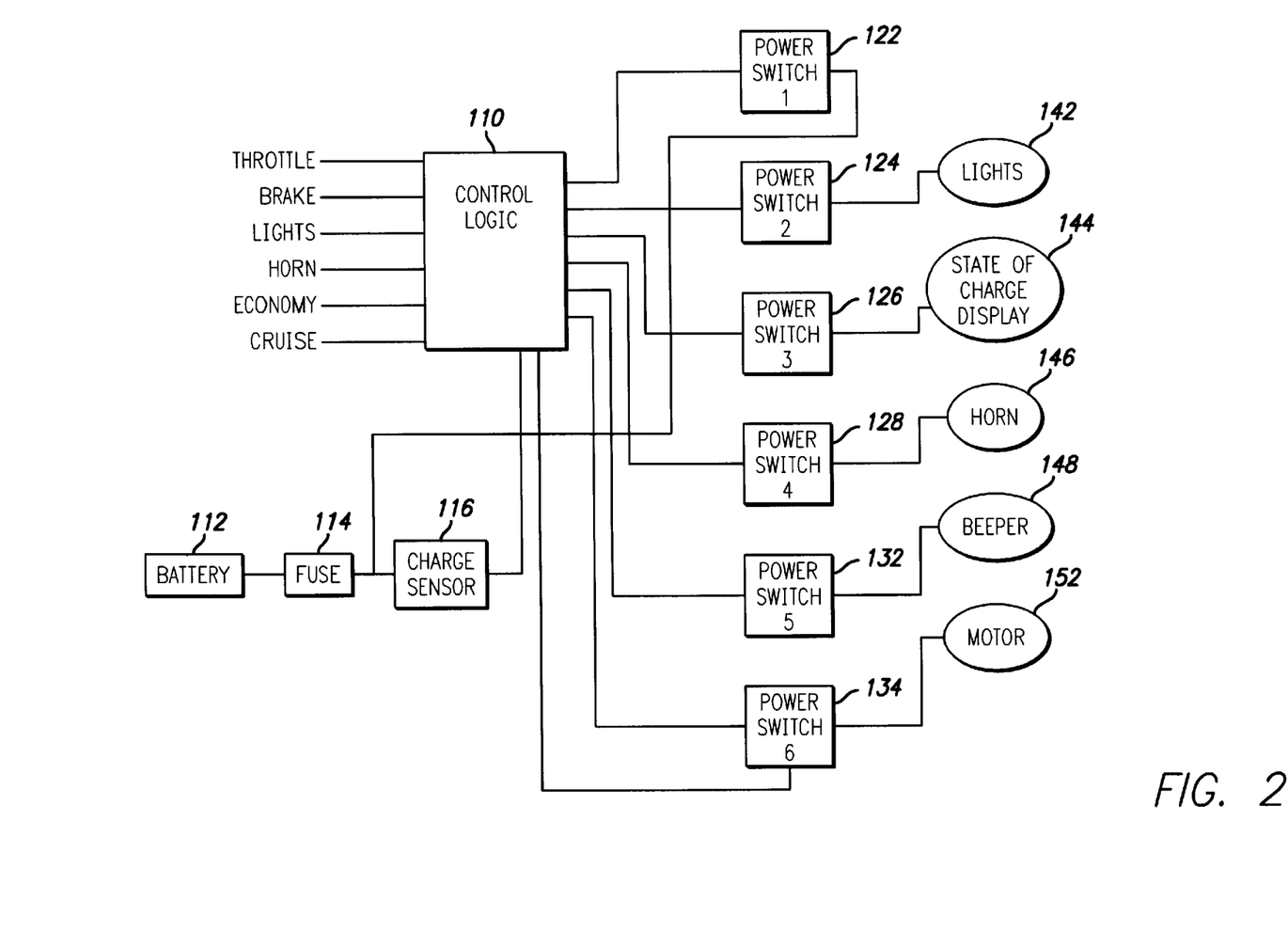
FIG. 2 is a block diagram of a control system for an electric powered bicycle.

FIG. 2 illustrates a block diagram of a control circuit for the electric powered bicycle 10 of FIG. 1. The control circuit includes a logic device 110 that controls the operation of various electrical systems based on control signals provided by the rider in the course of operating the electric powered bicycle 10, as will be further described below. The logic device 110 may be provided by discrete logic devices, an application specific integrated circuit (ASIC), a field programmable gate array (FPGA), a microcontroller, a digital signal processor (DSP), or the like. The electrical systems under the control of the logic device 110 include the bicycle lights 142 (including the front and rear lights 56, 58), the state of charge display 144 which reflects the current state of charge of the battery 112, the bicycle horn 146, the beeper which provides audible signals to the rider reflecting various operative states of the electric powered bicycle 10, and the motor 152 (including the hub motor 62).

The control circuit further includes a plurality of power switches 122, 124, 126, 128, 132, and 134. The logic device 110 provides respective control signals to each one of the power switches causing the respective switch to change state and thereby energize the corresponding electrical system. Power switch 122 is part of an emergency cut-off system for the motor 152, and will be described in greater detail below. Power switch 124 is connected to the lights 142. Power switch 126 is connected to the state of charge display 144. Power switch 128 is connected to the bicycle horn 146. Power switch 132 is connected to the beeper 148. Lastly, power switch 134 is connected to the motor 152. The power switch 134 further provides a sense signal to the logic device 110 that reflects the operational state of the motor 152, and is used to trigger the emergency cut-off system (described below). In a preferred embodiment of the invention, the power switches are provided by field-effect transistors (FETs), but it should be appreciated that other like switching devices, such as including bipolar transistors, Darlington transistors, thyristors, triacs, relays, etc., could also be advantageously utilized.

As noted above, the logic device 110 receives a plurality of input signals. A first input signal corresponds to the throttle position selected by the rider and causes the control logic device 110 to adjust the speed of motor 152. In an embodiment of the invention, the bicycle 10 may include a throttle provided by a variable resistor such that the rider can select a throttle position corresponding to a desired speed of the bicycle. A second input signal corresponds to actuation of the brakes by the rider and causes logic device 110 to command the brake lights to energize. The left/right hand levers 36 may include an electrical switch that closes upon manipulation by the rider. A third input signal corresponds to the turning on of the bicycle front and rear lights 56, 58, and may be provided by a light switch or button disposed on the handlebars 18. A fourth input signal corresponds to the sounding of the bicycle horn 146 and may be provided by a horn switch or button disposed on the handlebars 18. A fifth input signal corresponds to an economy mode of the bicycle 10 in which the motor 152 may be driven at rate other than the maximum rate. This fifth signal may be provided by a switch or button disposed on the handlebars 18. A sixth input signal corresponds to a cruise control mode of the bicycle 10 in which the motor 152 may be driven at a predetermined rate. This sixth signal may be provided by a switch or button disposed on the handlebars 18.

The electrical control circuit further includes a battery 112, fuse 114 and charge sensor 116 connected together in series. The battery 112 provides the power source for the electric powered bicycle 10. As known in the art, the electrical control circuit would further include voltage converters, regulators and/or like devices to reduce the DC voltage level (e.g., 24 volts) to a suitable level used for powering the logic device 110 and other electronic components. These conventional aspects of the electrical control circuit are omitted from the description and figures for simplicity. The charge sensor 116 provides a signal to the control logic device 110 reflecting the instantaneous charge level of the battery 112. The operation of the charge sensor 116 will be described in greater detail below. The fuse 114 is coupled to the power switch 122 in order to provide rapid disconnection of the battery 112 from all electrical systems, including the motor 152, in the event of an emergency situation, as will also be described in greater detail below.

Figure 3:
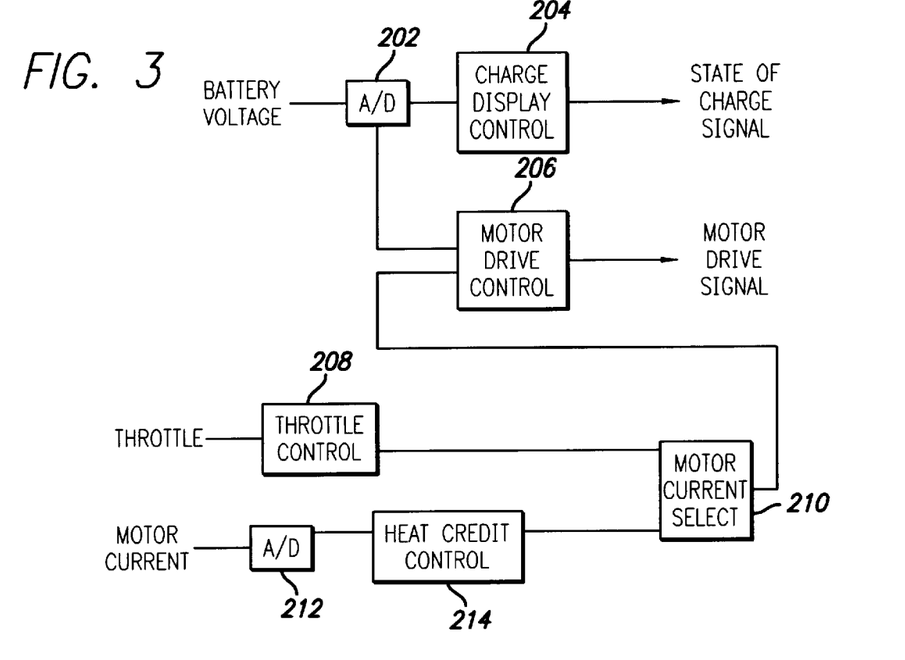
FIG. 3 is a block diagram of an embodiment of a motor control subsystem of the control system.

An embodiment of a motor control subsystem of the electrical control system is illustrated in FIG. 3 in conjunction with FIG. 2 described above. The charge sensor 116 illustrated in FIG. 2 is further shown as including an analog-to-digital (A/D) converter function 202 coupled to a charge display control circuit 204 included within the control logic 110. The A/D converter 202 periodically samples the battery voltage and provides a digital value corresponding to the battery voltage to the charge display control circuit 204. The charge display control circuit 204 then calculates the state of chage based on the sampled battery voltage, and communicates a signal to the state of charge display 144 through the power switch 126 (see FIG. 2) reflecting the current charge state of the battery. This charge state information is then visually displayed on the state of charge display 144. The charge display control circuit 204 may further include a look-up table that correlates differing voltage levels to plural charge states, e.g., fully charged, half-charged, empty. The charge states may correspond to lights, characters or symbols displayed on the charge display 144. For example, the charge display 144 may include three separate lights or light emitting diodes (LEDs) having respective colors corresponding to the aforementioned plural charge states, e.g., green representing 80to 100% charged, green and yellow representing 60 to 80% charged, yellow representing 40 to 60% charged, yellow and red representing 20 to 40% charged, red representing 20 to 0% charged, and flashing red representing empty. It should be appreciated that such an embodiment may additionally require the charge display control circuit 204 to communicate plural signals through plural respective power switches.

The motor control subsystem further includes a motor drive control circuit 206 included within the control logic 110 that provides a drive signal to the motor 152 through the power switch 134 (see FIG. 2). It is anticipated that a DC motor provides the motor 152. The drive signal provided to the motor 152 might further comprise a varying DC level signal in which the DC voltage corresponds to the desired rotational rate of the motor. Alternatively, the drive signal may comprise a pulse width modulated (PWM) signal having a duty cycle that varies in correspondence with the desired rotational rate of the motor 152. The motor drive control circuit 206 receives an input signal that reflects the desired speed of the vehicle 10 as determined from the setting of the throttle by the rider.

In an embodiment of the invention, the motor drive control circuit 206 also receives an input signal from the charge sensor 116, such as directly from the A/D converter 202 as shown in FIG. 3. The motor 152 represents the single biggest load placed upon the battery 112, and the charge level of the battery is depressed when the motor is drawing current from the battery. As a result, a battery charge measurement made while the motor is drawing current from the battery may be somewhat inaccurate. To provide a more accurate charge measurement, the A/D converter 202 provides a signal to the motor drive control circuit 206 that causes the motor drive control circuit 206 to halt the motor drive signal provided to the motor 152. The A/D converter 202 thereafter samples the battery voltage after waiting a period of time sufficient to allow the battery voltage to settle. This way, the charge sensor may make a more accurate measurement of the current state of charge of the battery 112.

Another aspect of the motor control subsystem pertains to the throttle control over the motor drive control circuit 206. As noted above, the motor drive control circuit 206 receives an input signal that reflects the desired speed of the bicycle 10. A throttle control circuit 208 receives the throttle input reflecting the instantaneous position of the throttle control on the bicycle handlebars 18. In an embodiment of the invention, the throttle comprises a variable resistor coupled to ground in series with a capacitor provided within the throttle control circuit 208. The capacitor is periodically discharged through the variable resistor, and the capacitor discharge time is measured. The measured discharge time corresponds to the resistance of the variable resistor, and hence the position of the throttle. It should be appreciated that various other known ways to detect the throttle position may also be advantageously utilized.

The throttle control circuit 208 provides an output signal corresponding to the detected throttle position. The throttle output signal may be provided directly to the motor drive control circuit 206 to generate the motor drive signal therefrom. Alternatively, as shown in FIG. 3, the motor control subsystem may further include circuitry to control the motor speed in a manner that takes account of heat accumulated by the motor, including A/D converter 212, heat credit control circuit 214 and motor current select circuit 210. Generally, electric motors have a continuous current rating that defines how much current the motor can handle over a long period of time. In some applications, it is advantageous to exceed the current rating for the motor over a short period of time, such as in response to an increased load, e.g., going up a hill. Motors used in this manner are typically monitored to limit the heat build-up in the motor in order to prevent the motor from exceeding the temperature limit and causing damage to the motor. The heat sensors and associated wiring add complexity and cost to an electrical system, and it is therefore desirable to eliminate the need for such additional components.

To address this particular problem, the motor is given a "heat budget" that defines an allowable amount of heat for the motor. If the motor current is higher than a predefined steady state level, the temperature of the motor will increase. Conversely, if the motor current is lower than the predefined steady state level, the temperature of the motor will decrease. Initially, if the motor is commanded to operate at a current that is higher than the predefined steady state level, the motor is permitted to operate at the higher current level but heat credits are deducted from the heat budget. If the motor is commanded to operate at a lower current than the predefined steady state level, then heat credits are added to the heat budget. As the heat credits are consumed, the maximum amount of current allowed in the motor is decreased until the current reaches the predefined steady state level. In addition, the amount of current supplied to the motor may be reduced if the motor temperature is already high. Specifically, if the motor has been driven hard, or if it is a hot day and the motor has less than a normal amount of thermal capability, then the allowable heat credits are further reduced below the normal amount.

More particularly, the A/D converter 212 periodically samples the current provided to the motor 152 and provides a digital value corresponding to the motor current to the heat credit control circuit 214. The digital current signal corresponds to an estimate of the heat level in the motor 152. The heat credit control circuit 214 executes an algorithm in accordance with the above description. Specifically, the heat control circuit 214 determines the available heat credits as follows:

heat=heat+(steady state current−current)

wherein heat represents the heat credit value, steady state current represents the predefined steady state current limit, and current represents the current level detected by the A/D converter 212. The motor current select circuit 210 receives the heat credit value from the heat credit control circuit 214 and the throttle output signal from the throttle control circuit 208, and provides a current select signal to the motor drive control circuit 206 in accordance with the smaller of the two input signals. Thus, if the throttle control circuit 208 wants to command the motor 152 to operate at a current that is higher than the predefined steady state level, and the number of heat credits are high enough (i.e., the heat credit value is greater than the throttle output signal), the motor current select circuit 210 uses the throttle output signal to drive the motor. Conversely, if the throttle control circuit 208 wants to command the motor 152 to operate at a current that is higher than the predefined steady state level, and the number of heat credits are too low (i.e., the heat credit value is less than the throttle output signal), the motor current select circuit 210 uses the heat credit value to drive the motor at a lower current level. Eventually, as the motor 152 cool downs and the available heat credits increase, the motor can again be driven at the speed commanded by the throttle control circuit 208.

Figure 4A:
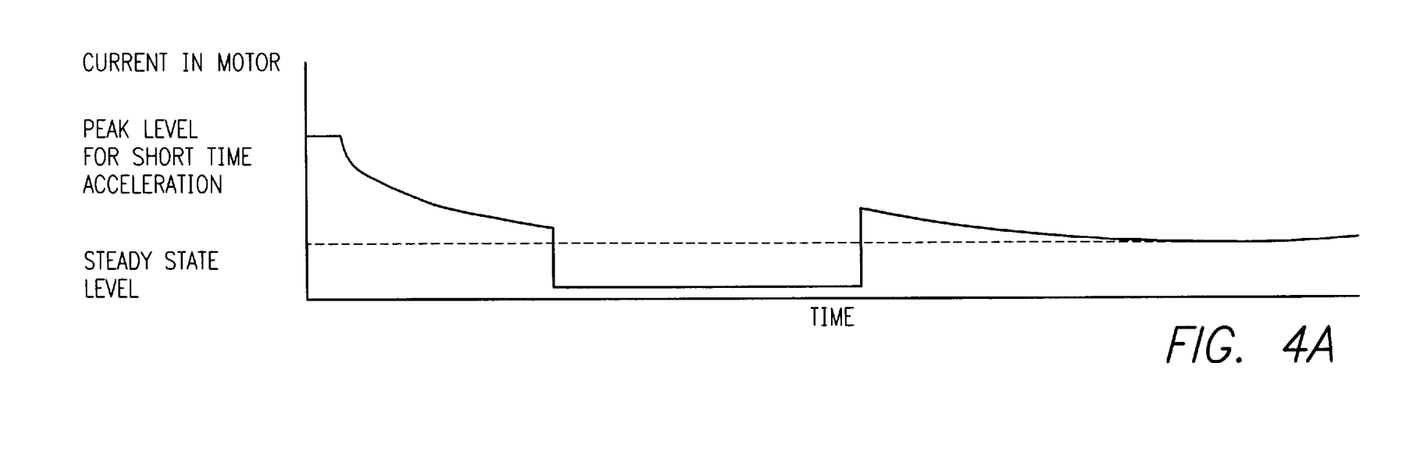
FIGS. 4A and 4B are graphs illustrating changes in motor current and heat credits with varying power requirements over time.
Figure 4B:
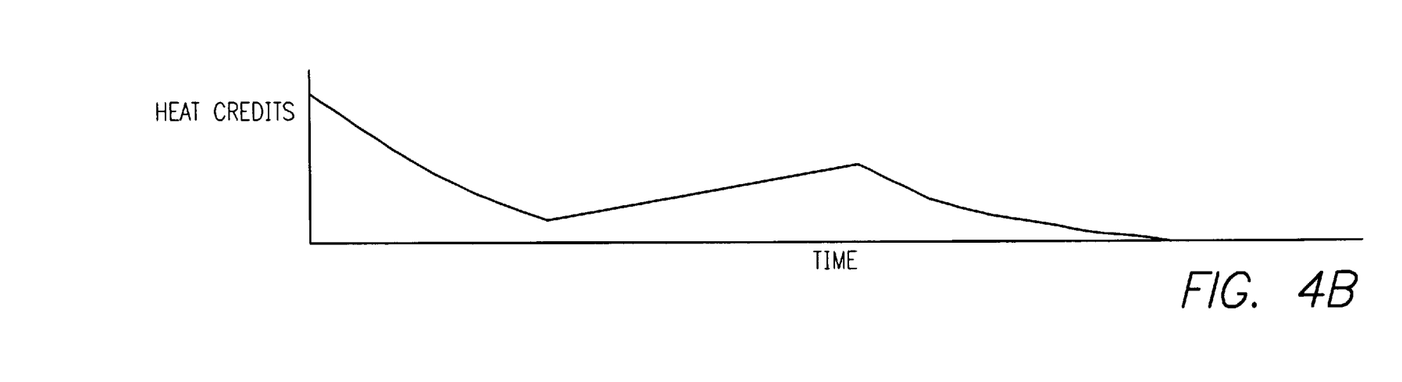

This aspect of operation of the motor control subsystem is represented graphically in FIGS. 4A–4B, wherein FIG. 4A depicts changes in motor current with varying power requirements over an exemplary time period and FIG. 4B depicts changes in heat credits over the same time period. A first portion of the graph reflects relatively high power requirements that exceed the predefined steady state level. Since the heat credits are relatively high during this period, the motor control subsystem continues to supply current to the motor at a rate commanded by the throttle. A second portion of the graph reflects relatively low power requirements that are below the predefined steady state level. The heat credits are replenished during this period, and little or no current is supplied by the motor control subsystem to the motor. A third portion of the graph reflects a return to relatively high power requirements that exceed the predefined steady state level. The motor control subsystem supplies current to the motor at a decreasing which is limited by the available heat credits. When the heat credits drop to zero, the current in the motor is limited to the predetermined steady state level.

Alternatively, it should be appreciated that the amount of heat within the motor could be measured directly using thermal sensors disposed on or in the motor that yield a signal corresponding to the heat level in the motor. This signal could then be provided to the heat credit control circuit 214. Nevertheless, the foregoing estimate of the heat based on the measured current level reduces the complexity and number of components of the control system by eliminating the thermal sensors. Moreover, it should be appreciated that the foregoing algorithm used to determine the heat credit value is simply one example of the numerous possible algorithms that persons skilled in the art could utilize to achieve heat control.

Figure 5:
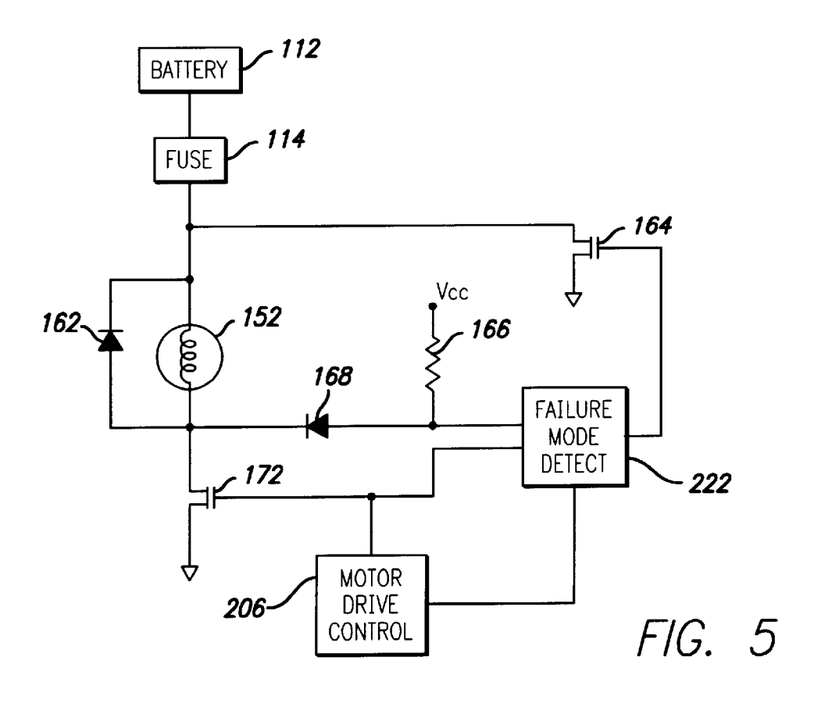
FIG. 5 is a block diagram of an alternative embodiment of a motor control subsystem of the control system including an emergency battery cutoff subsystem.

Another drawback of the use of DC motors for an electric powered vehicle is that there are multiple potential failure modes in which the full battery voltage may be applied to the motor, causing it to run away at full torque and full speed. This can cause the vehicle to accelerate to full speed in an uncontrolled manner, resulting in a very unsafe condition. To address this problem, the present electrical control system further includes circuitry that identifies when the motor has entered a failure state in which voltage is applied to the motor in an uncontrolled manner, and disconnects the battery from the motor to prevent the run away condition when such a failure state is detected. FIG. 5 illustrates an alternative embodiment of a motor control subsystem that includes an emergency battery cutoff subsystem. The battery 112 is coupled to the positive lead of motor 152 through fuse 114. The motor 152 is represented in FIG. 5 as an inductor. The negative lead of the motor 152 is coupled to ground through power switch 172. As illustrated in FIG. 5, power switch 172 is provided by a field-effect transistor (FET). The gate terminal of the power switch 172 is coupled to the motor drive control circuit 206, with the source terminal coupled to the negative lead of the motor 152 and the drain terminal coupled to ground. As described above, the motor drive control circuit 206 provides a motor drive signal that turns on the power switch 172, causing electrical current to flow through the motor 152 and thereby cause it to operate. The motor drive signal may further comprise a pulse width modulated signal as described above.

The emergency battery cutoff subsystem further includes a failure mode detect circuit 222 having a first input coupled to the negative terminal of the motor 152 through diode 168, and a second input coupled to the output of the motor drive control circuit 206. The first input of the failure mode detect circuit 222 is further coupled to a voltage source ($V_{cc}$) though a resistor 166. Diode 162 is provided in parallel with motor 152. When the motor drive signal turns off the power switch 172 to block current flow to the motor 152 from the battery, the voltage at the first input of the failure mode detect circuit 222 is high (i.e., at $V_{cc}$). Conversely, when the motor drive signal turns on the power switch 172 to enable current flow to the motor 152 from the battery, the voltage at the first input of the failure mode detect circuit 222 is low (i.e., at ground). The first input of the failure mode detect circuit 222 thereby corresponds to the actual state of the motor 152 (i.e., on or off).

The failure mode detect circuit 222 contains digital logic that compares the actual state of the motor 152 to the output of the motor drive control circuit 206. During normal conditions, the first and second inputs to the failure mode detect circuit 222 should be inverse. particularly, when the motor drive signal (i.e., second input) is enabled (i.e., high), the first input should be low, and when the motor drive signal (i.e., second input) is disabled (i.e., low), the first input should be high. The failure mode detect circuit 222 recognizes a potential problem condition when the motor drive signal is disabled (i.e., low), but the first input remains low indicating that current is still being supplied to the motor 152. This may reflect that the power switch 172 has failed in the on position, or other problem with the motor 152, the wiring, or the motor drive control circuit 206.

When this problem state is detected, the failure mode detect circuit 222 enters a worried state whereby it sends a signal to the motor drive control circuit 206 instructing the motor drive control circuit to discontinue further motor drive signal pulses to the power switch 172. The failure mode detect circuit 222 remains in the worried state for a predetermined period of time (e.g., 32 milliseconds), during which it continues to monitor the state of the first and second inputs. If the inputs return to a normal condition within the predetermined period of time, the failure mode detect circuit 222 turns off the signal to the motor drive control circuit 206 to allow ordinary operation of the motor 152 to resume. But, if the inputs to the failure mode detect circuit 222 do not return to a normal condition within the predetermined period of time, the failure mode detect circuit 222 enables power switch 164 which shorts the battery to ground through fuse 114. This diverts the current from the battery 112 to ground through the power switch 164, rather than through the motor 152, and the rapid increase in current due to decreased load would cause the fuse 114 to open. As a result, the battery 112 would be disconnected from the motor 152 until the fuse 114 is either replaced or reset.

Cruise control systems are known for use with motor vehicles, but have not been adapted for use with electric powered vehicles, particularly electric powered bicycles, for primarily safety considerations. An automotive cruise control system allows a desired speed to be set by an operator of the vehicle, and the vehicle engine is adjusted to maintain the desired speed with changing road conditions, e.g., hills, wind, etc. Automotive cruise control systems are typically disabled by depressing the brake or accelerator pedals of the vehicle, or by switching off the cruise control system. Such cruise control systems are not directly applicable to electric powered bicycles since these types of controls are lacking. Moreover, the inability to rapidly disengage a cruise control system on an electric powered bicycle can represent a substantial safety risk to the rider.

Figure 6:
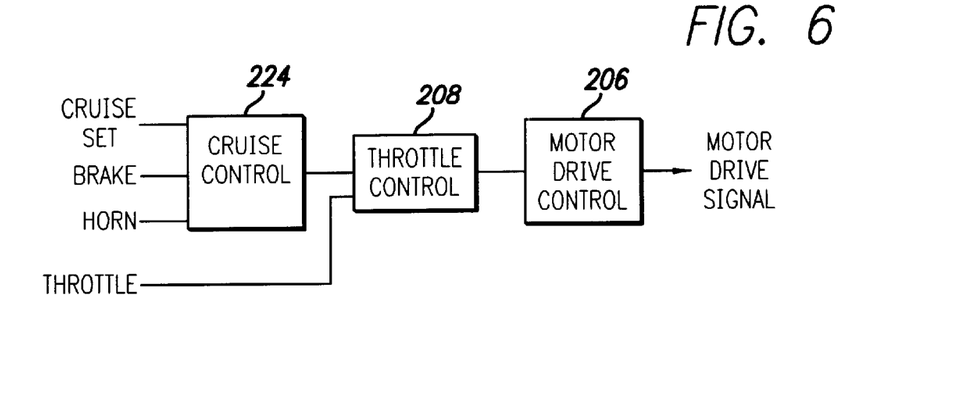
FIG. 6 is a block diagram of an alternative embodiment of a motor control subsystem of the control system including a cruise control subsystem.

FIG. 6 illustrates an alternative embodiment of a motor control subsystem that includes a cruise control subsystem adapted for use with an electric powered bicycle (or other type of vehicle). The motor control subsystem includes a cruise control circuit 224, a throttle control circuit 208, and a motor drive control circuit 206. The operation and structure of the throttle control circuit 208 and the motor drive control circuit 206 were described previously. The cruise control circuit 224 receives three inputs, including a cruise toggle input, a brake input, and a horn input. The cruise toggle input is coupled to a switch provided on the handlebars or elsewhere on the bicycle 10 to turn on the cruise control system. Once the cruise control system is initiated, the cruise control circuit 224 provides a signal to the throttle control 208 to lock the output signal to the motor drive control circuit 206 to a speed corresponding to the last detected throttle position. The motor drive control circuit 206 then generates the motor drive signal therefrom in the same manner described above. The rider disengages the cruise control system by either pressing the cruise toggle input, or by pressing the brake or horn. As discussed above, pressing the brake generates a signal on the brake input, and pressing the horn generates a signal on the horn input. Thus, the cruise control subsystem can be disengaged using any of the normal panic behaviors, e.g., pressing brakes or horn.

Figure 7:
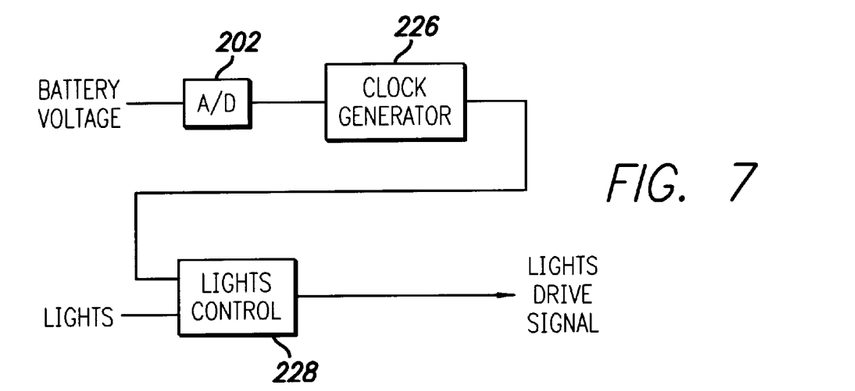
FIG. 7 is a block diagram of a lights control subsystem of the control system.

Another consideration with electric powered vehicles is that the battery voltage fluctuates as the load is varied. For example, a 24-volt battery may actually vary between 20 and 29 volts, and a 36-volt battery may actually vary between 30 and 40 volts. Certain electrical components, such as headlights, generally operate at a fixed DC voltage, e.g., 12 volts. The fluctuating battery voltage can result in degraded operation of such electrical components, such as dimming of the vehicle headlights. To address this problem, another embodiment of the electrical system includes a lights control subsystem as illustrated in FIG. 7. The lights control subsystem includes an A/D converter 202, a clock generator 226, and a lights control circuit 228. The A/D converter 202 periodically samples the battery voltage and generates a digital signal corresponding to the voltage squared. The clock generator 226 generates a pulse width modulated waveform having a pulse width that varies in inverse correspondence with the voltage squared. The lights control circuit 228 receives an input signal from the light switch as well as the pulse width modulated waveform from the clock generator 226. When the light switch is on, the lights control circuit 228 passes the pulse width modulated waveform to the lights 142 through the power switch 124 (see FIG. 2).

The pulse width modulated waveform may be controlled such that an equivalent of a 12-volt level is provided notwithstanding the varying battery voltage. As a result, the vehicle headlights will produce a near constant level of illumination. This also allows the light to be used on a system that is powered by higher than a 12-volt voltage.

Figure 8:
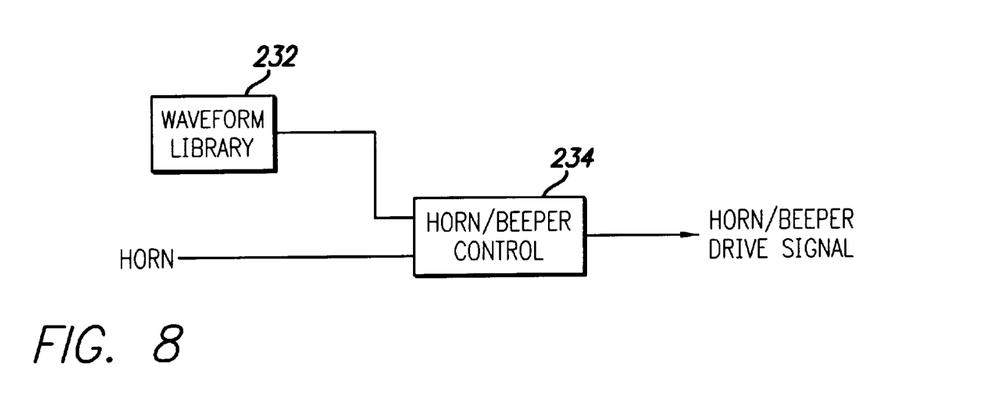
FIG. 8 is a block diagram of a horn/beeper control subsystem of the control system.

As noted above, the present electric powered bicycle 10 includes a horn 146 and beeper 148. In another embodiment of the electrical system, a single horn is adapted to provide both functions. FIG. 8 illustrates a horn/beeper control subsystem that includes a waveform library 232 and a horn/beeper control circuit 234. The waveform library 232 stores a plurality of different types of waveforms. One such waveform corresponds to the horn sound, while other waveforms correspond to other sounds that communicate information to the rider such as low battery or pedal assist initiated. The horn waveform may have a much higher DC level than the other waveforms to produce a louder sound. The horn/beeper control circuit 234 receives an input from the horn button. When the rider presses the horn button, the horn/beeper control circuit 234 communicates with the waveform library 232 to retrieve the corresponding horn waveform. The horn/beeper control circuit 234 then generates an output signal to drive the horn 136 through the power switch 128 (see FIG. 2). When the horn/beeper control circuit 234 receives other input signals (not shown) from related components of the control logic 110, the horn/beeper control circuit retrieves corresponding waveforms from the waveform library 232 to drive the horn 136 accordingly. As with the light control subsystem described above, the average voltage level provided to the horn 136 can be controlled by varying the pulse width of the driving waveform. Moreover, the horn/beeper control subsystem can be further modified to sample the battery voltage in the same manner as the light control subsystem so that a constant volume horn output will be produced as the battery voltage varies.

Since bicycles are used for exercise as well as transportation, it is desirable to include certain additional features with the electric powered bicycle to enable it to serve as an exercise or physical therapy device. Stationary bicycles and other exercise systems are known to provide biofeedback control in which certain biological parameters of the rider can be monitored, such as heart rate, oxygen count, etc. The objective of such systems is to bring the rider's biological parameters up to a target level and maintain them at that level without allowing the parameters to go too high.

Figure 9:
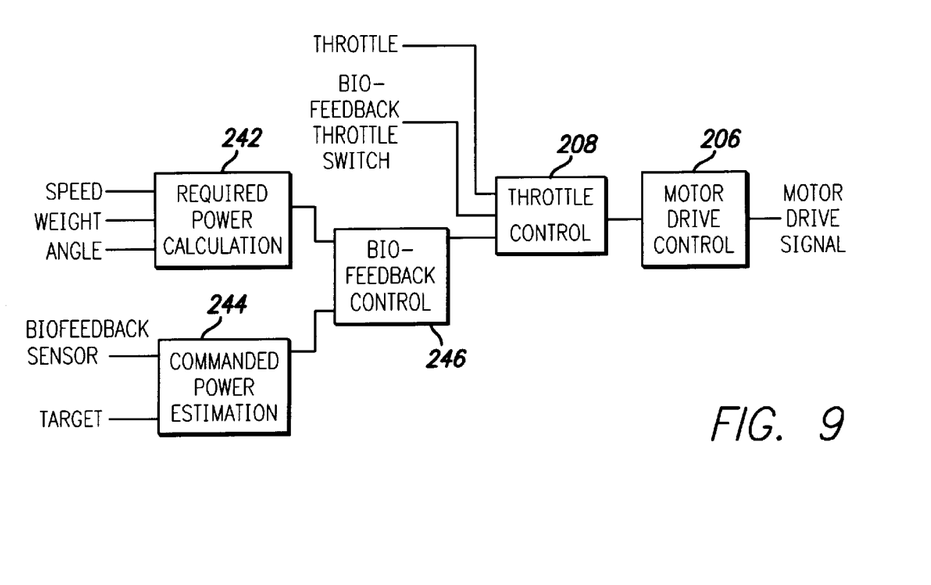
FIG. 9 is a block diagram of a biofeedback control subsystem of the control system.

In yet another embodiment of the invention, the electrical system is adapted to provide biofeedback control so that the electric powered bicycle can function as an exercise or physical therapy device. FIG. 9 illustrates an embodiment of the electrical control system that includes a biofeedback control subsystem. The biofeedback control subsystem adds three additional elements to the electrical control system, including a required power calculation circuit 242, a commanded power estimation circuit 244, and a biofeedback control circuit 246. The throttle control circuit 208 receives an input from a biofeedback/throttle switch disposed on the handlebars or elsewhere on the bicycle that puts the motor control subsystem into the biofeedback mode. The required power calculation circuit 242 receives certain data entered by the rider into a keypad or other input device, including the desired speed, the weight of the rider, and the angle or inclination of the bicycle. Based on this data, the required power calculation circuit 242 determines an ideal amount of power that the rider must generate in order to achieve a desired bio-function level with respect to heart rate, oxygen level, calorie consumption or other like parameter. The required power calculation circuit 242 may further include a look-up table that maps the input data to a power level that achieves a desired bio-function. The commanded power estimation circuit 244 estimates the power being generated by the user to run the electric powered bicycle at the desired speed. The commanded power estimation circuit 244 includes certain input signals, such as from a biofeedback sensor coupled to the user to detect heart rate, and a target input that defines the target heart rate as a function of time. Alternatively, the actual power output from the user may be measured directly, such as by including sensors to detect movement of the pedals. The biofeedback control circuit 246 receives signals from each of the required power calculation circuit 242 and the commanded power estimation circuit 244. If the estimated power exceeds the ideal power, then the biofeedback control circuit 246 sends a signal to the throttle control circuit 208 causing it to increase the amount of pedal assist provided by the motor 152. Conversely, if the estimated power is less than the ideal power, then the biofeedback control circuit 246 sends a signal to the throttle control circuit 208 causing it to decrease the amount of pedal assist provided by the motor 152.

Having thus described a preferred embodiment of an electrical system for an electric powered bicycle, it should be apparent to those skilled in the art that certain advantages of the within system have been achieved. It should also be appreciated that various modifications, adaptations, and alternative embodiments thereof may be made within the scope and spirit of the present invention. For example, an electric powered bicycle has been illustrated, but it should be apparent that the inventive concepts described above would be equally applicable to other electric powered vehicles, such as scooters, tricycles, four-wheeled vehicles, and the like. The invention is further defined by the following claims.

What is claimed is:

1. A control system for an electric powered vehicle, comprising:

a motor;

a motor drive control circuit coupled to said motor and providing a motor drive signal thereto;

a throttle control circuit providing a throttle signal to said motor drive control circuit corresponding to a desired speed of said motor, said throttle signal comprising a current level;

a heat control circuit electrically connected to said motor, said heat control circuit making an estimate of an amount of heat within said motor, based on a measured current load of said motor and comparing said estimated amount of heat to a threshold level, said heat control circuit adding heat credits if said estimated amount of heat is below said threshold level and subtracting heat credits if said estimated amount of heat is above said threshold level; and a motor current select circuit providing a motor current signal to said motor drive control circuit, said motor current signal corresponding to said current level of said throttle signal if an available amount of said heat credits exceeds an amount of said heat credits needed by said current level of said throttle signal, and said motor current signal being reduced if said available amount of said heat credits fails to exceed said heat credits needed by said current level of said throttle signal.

2. The control system of claim 1, wherein said heat control circuit further comprises an analog-to-digital converter adapted to sample a current level to said motor.

3. The control system of claim 1, wherein said motor drive signal further comprises a pulse width modulated signal.

4. The control system of claim 1, further comprising a power switch electrically coupled between said motor and said motor drive control circuit.

5. The control system of claim 1, further comprising:
   a battery providing a power source for said motor; and
   a charge sensing circuit coupled to said battery and providing a signal reflecting a charge state of said battery, said charge sensing circuit additionally providing a control signal to said motor drive control circuit to discontinue said motor drive signal for a period of time sufficient to sample an unloaded voltage output of said battery.

6. The control system of claim 5, wherein said charge sensing circuit further comprises an analog-to-digital converter adapted to sample said unloaded voltage output of said motor.

7. The control system of claim 1, further comprising a cruise control circuit coupled to said throttle control circuit and providing a signal causing said throttle control circuit to lock said throttle signal at a current level, said cruise control circuit being disengaged upon receipt of a horn input.

8. The control system of claim 1, wherein said threshold level comprises a continuous current rating of said motor.

9. The control system of claim 1, wherein said available amount of said heat credits is determined by adding an amount of said heat credits before said estimated amount of heat is estimated with a value determined by subtracting said estimated amount of heat from said threshold level.

10. The control system of claim 2, wherein said estimate of the amount of heat within said motor is based on said sampled current level.

11. The control system of claim 10, wherein said available amount of said heat credits comprises adding an amount of said heat credits before said current level is sampled with a value determined by subtracting said sampled current level from said threshold level.

12. The control system of claim 11, wherein said threshold level comprises a continuous current rating of said motor.

13. A control system for an electric powered vehicle, comprising:
   a motor;
   a motor drive control circuit coupled to said motor and providing a motor drive signal thereto;
   a throttle control circuit providing a throttle signal to said motor drive control circuit corresponding to a desired speed of said motor;
   a heat control circuit electrically connected to said motor, said heat control circuit making an estimate of an amount of heat within said motor and comparing said estimated amount of heat to a threshold level, said heat control circuit adding heat credits if said estimated amount of heat is below said threshold level and subtracting heat credits if said estimated amount of heat is above said threshold level, wherein said estimate of the amount of heat within said motor is based on a current level of said motor; and
   a motor current select circuit providing a motor current signal to said motor drive control circuit, said motor current signal corresponding to said throttle signal if said heat credits exceed said throttle signal, and said motor current signal being reduced if said heat credits fail to exceed said throttle signal.

14. A control system for an electric powered vehicle, comprising:
   a motor;
   a motor drive control circuit coupled to said motor and providing a motor drive signal thereto;
   a throttle control circuit providing a throttle signal to said motor drive control circuit corresponding to a desired speed of said motor;
   a heat control circuit electrically connected to said motor, said heat control circuit making an estimate of an amount of heat within said motor and comparing said estimated amount of heat to a threshold level, said heat control circuit adding heat credits if said estimated amount of heat is below said threshold level and subtracting heat credits if said estimated amount of heat is above said threshold level, wherein said threshold value comprises a continuous current rating of said motor; and
   a motor current select circuit providing a motor current signal to said motor drive control circuit, said motor current signal corresponding to said throttle signal if said heat credits exceed said throttle signal, and said motor current signal being reduced if said heat credits fail to exceed said throttle signal.

15. A control system for an electric powered vehicle, comprising:
   a motor;
   a motor drive control circuit coupled to said motor and providing a motor drive signal thereto;
   a throttle control circuit providing a throttle signal to said motor drive control circuit corresponding to a desired speed of said motor;
   a heat control circuit electrically connected to said motor, said heat control circuit making an estimate of an amount of heat within said motor based on a measured current level of said motor using heat credits, wherein an available amount of said heat credits is determined by adding an amount of said heat credits before said measured current level is measured with a value determined by subtracting said measured current level from a threshold level; and
   a motor current select circuit providing a motor current signal to said motor drive control circuit, said motor current signal corresponding to said throttle signal if said heat credits exceed said throttle signal, and said motor current signal being reduced if said heat credits fail to exceed said throttle signal.

* * * * *